UNITED STATES PATENT OFFICE.

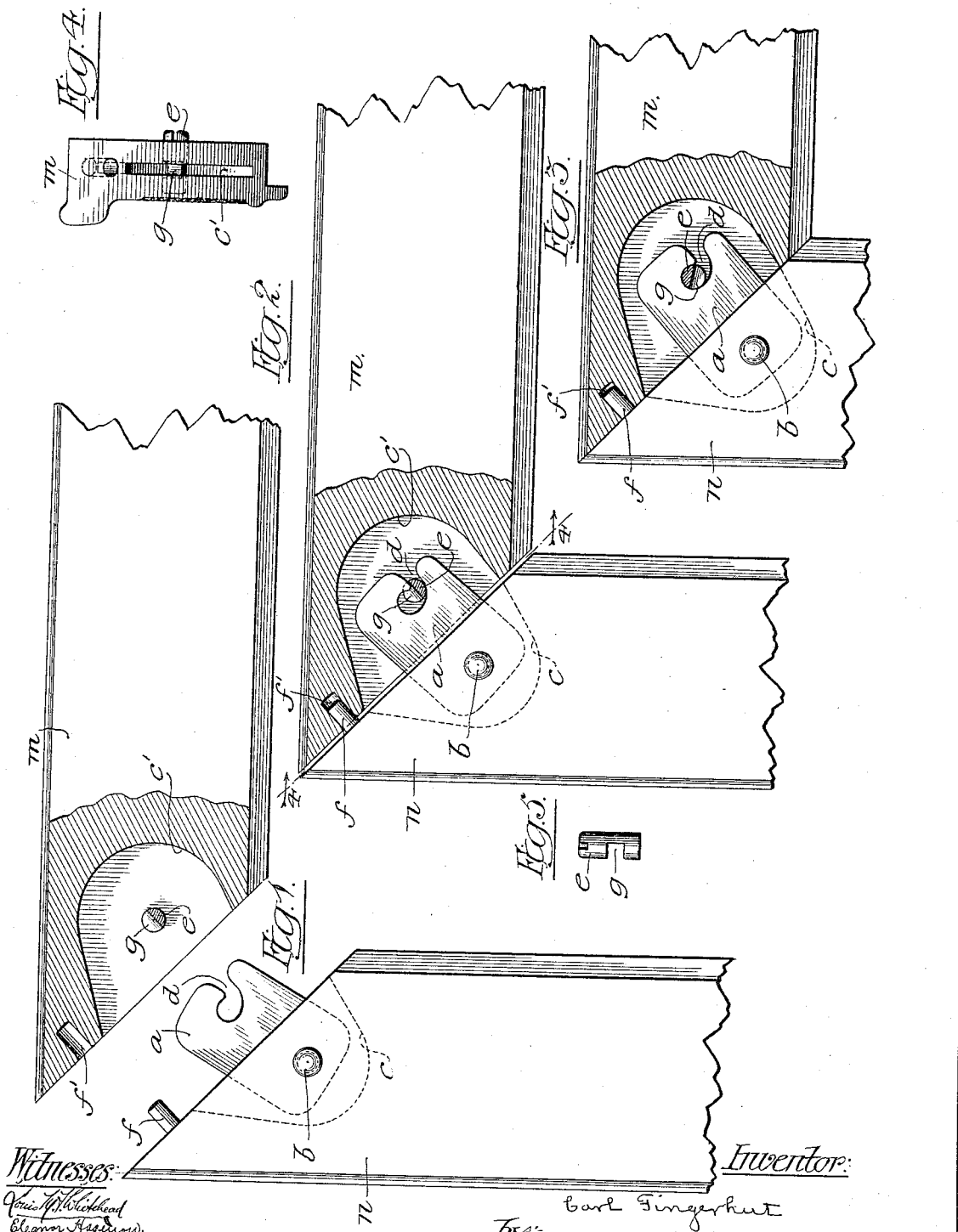

CARL FINGERHUT, OF CHICAGO, ILLINOIS.

FRAME-JOINT.

1,130,807.

Specification of Letters Patent.

Patented Mar. 9, 1915.

Application filed July 29, 1912. Serial No. 712,125.

*To all whom it may concern:*

Be it known that I, CARL FINGERHUT, a subject of the Emperor of Germany, and a resident of the city of Chicago, county of Cook, and State of Illinois, have invented certain new and useful Improvements in Frame-Joints, of which I do declare the following to be a full, clear, and exact description, reference being had to the accompanying drawing, forming a part of this specification.

The invention designs to provide a neat, strong and effective union for the joints of picture frames, window screens, window sashes, or other sorts of frames in which the parts are to be united by bevel joints to constitute a stout inclosure for the retention and support of some separate fabric or the like.

The nature of the improvements will appear in detail from the description following and be more distinctly pointed out by claims at the conclusion.

On the drawings: Figure 1 is a plan view showing the dual frame pieces disunited at the corner, bevel joint, one of the kerf seats being displayed in section. Fig. 2 is a like view but with the companion frame pieces abutted together and the lock-pin set for admission to the cam slot. Fig. 3 is a view similar to Fig. 2, but with the lock-pin turned to a snug seat against the cam slot. Fig. 4 is a cross section view at the bevel on line 4—4 of Fig. 2. Fig. 5 is an elevation view of the screw lock-pin detached.

The ordinary picture-frame, for example is made up of four separate pieces, united by bevel joints at the corners, which are generally secured together by nails or screws driven through and across the joints from opposite edges of the companion dual frame pieces. The nails or screws leave unsightly holes that need to be puttied and, besides, are apt to split or impair the strength of the frame, especially if the stuff chosen be thin or fragile.

The present invention aims to dispense with nails, screws or the like altogether and to employ instead internal fasteners mounted in place beforehand, in readiness to interlock, once the frame pieces adjacent are brought together at the joint, for permanent union.

At each corner of the rectangular frames $m, n$, there is a tongue $a$ pivoted as at $b$ in a kerf seat $c$ cut in the bevel edge of one of the frame pieces. Tongue $a$ projects into a free kerf or slit $c'$ cut in the opposite bevel edge of the companion frame piece. The tongue has an open slot $d$ at its front to co-act with a lock pin $e$ which extends across the other kerf and is furnished externally with a screw head terminal. A guide pin $f$ on one frame piece seats in a corresponding hole $f'$ in the opposite and serves to position the tongue slot $d$ with reference to the cross notch $g$ in lock pin $e$. Once the slot $d$ in tongue $a$ passes beyond or clears the notch corner on joining together the bevel frame pieces, as in Fig. 2, it becomes feasible thereupon to turn the lock pin $e$ by aid of a screw driver, so that the body of the pin shall roll against the adjacent cam-like edge or slot $d$ to draw the two pieces tightly together, as in Fig. 3.

It should be noted that the outer edge of the cam-slot $d$ is undercut so that a hook is formed at the end of the tongue $a$ with which the pin $e$ coöperates to swing the tongue about its pivot and thereby move the hook over the pin. By providing a pivotal tongue, the turning of the pin to draw the frame pieces together does not tend in any way to draw the frame pieces out of proper alinement. It is obvious that changes may be made in the details set forth without departure from the essentials of the invention as defined in the claims.

Having thus described my invention, what I claim as new, and desire to secure by Letters Patent, is:

1. In frame joints, the combination of a frame piece having a pivotal tongue projecting therefrom, said tongue having a cam slot undercut to form a hook at the end of the tongue, a companion frame piece recessed to seat said tongue and having a lock pin cross cut to engage said cam slot and arranged to coöperate with the hook of said tongue to draw the frame pieces together and swing said tongue upon its pivot, substantially as described.

2. In frame joints, the combination of a frame piece having a pivotal tongue projecting therefrom, said tongue having a cam slot at its end undercut to form a hook at the end of the tongue, a companion frame piece having a lock pin cross cut to engage said cam slot of said tongue and arranged to coöperate with the end hook thereof to draw said frame pieces together and swing said tongue upon its pivot, one of said frame pieces having a projecting dowel pin and the other a hole to receive the same to thereby aline said frame pieces, substantially as described.

CARL FINGERHUT.

Witnesses:
JAMES H. PEIRCE,
ANNIE C. COURTENAY.

Copies of this patent may be obtained for five cents each, by addressing the "Commissioner of Patents, Washington, D. C."